United States Patent [19]

Shinnar et al.

[11] Patent Number: 5,277,884
[45] Date of Patent: Jan. 11, 1994

[54] SOLVENTS FOR THE SELECTIVE REMOVAL OF $H_2S$ FROM GASES CONTAINING BOTH $H_2S$ AND $CO_2$

[76] Inventors: Reuel Shinnar, 110 Ash Dr., Great Neck, N.Y. 11021; A. Ullmann, 153-18 73rd Ave. #2D, Flushing, N.Y. 11367; Zvi Ludmer, Kfar Gibion, Rehovot 76910, Israel

[21] Appl. No.: 844,539

[22] Filed: Mar. 2, 1992

[51] Int. Cl.$^5$ ............................................. B01D 53/34
[52] U.S. Cl. ................................... 423/226; 423/228; 95/235
[58] Field of Search ................ 423/226, 228; 55/73; 210/643; 252/189; 95/235

[56] References Cited

U.S. PATENT DOCUMENTS

| | | | |
|---|---|---|---|
| 2,437,288 | 3/1948 | Anderson | 423/226 |
| 2,863,527 | 12/1958 | Herbert et al. | 62/17 |
| 2,926,751 | 3/1960 | Kohl et al. | 423/226 |
| 3,103,411 | 9/1963 | Fuchs et al. | 423/224 |
| 4,029,744 | 6/1977 | Li et al. | 210/643 |
| 4,198,388 | 4/1980 | Laslo et al. | 423/228 |
| 4,208,382 | 6/1980 | Blume et al. | 55/73 |
| 4,575,387 | 3/1986 | Larue et al. | 55/56 |
| 4,822,576 | 4/1989 | Chu | 423/228 |
| 4,954,260 | 9/1990 | Ludmer et al. | 210/634 |

FOREIGN PATENT DOCUMENTS 2245889  1/1992  United Kingdom ............... 423/226

OTHER PUBLICATIONS

O'Connell, J. P. "Molecular Thermodynamics of Gases in Mixed Solvents", American Institute of Chemical Engineer, Journal, May 1971, pp. 658–663.
Chemical Abstracts, vol. 103, #60107v (1985).
Ludmer, Z. et al. "Solubility in Binary Mixtures at the Immiscibility Critical Point". American Institute of Chemical Engineer. Journal, Nov. 1987, pp. 1776–1780.

*Primary Examiner*—Michael Lewis
*Assistant Examiner*—Peter T. DiMauro

[57] ABSTRACT

A novel class of solvents is described that have improved selectivity for $H_2S$ as compared to $CO_2$. The solvents are based on adding suitable second partially miscible solvent to known solvents. In specific, it is shown that adding 20% of dodecane to NMP (normal methyl pyrolidinone) increases the selectivity of the solvent for $H_2S$ as compared to $CO_2$ by 50%. This leads to important process improvements and reduction in the cost of the removal process.

3 Claims, 4 Drawing Sheets

SOLVENTS FOR THE SELECTIVE REMOVAL OF $H_2S$ FROM GASES CONTAINING BOTH $H_2S$ AND $CO_2$

BACKGROUND OF THE INVENTION

Field of the Invention

Physical solvents such as methanol, NMP (normal methyl pyrolidinone) [U.S. Pat. No. 3,103,411 and U.S. Pat. No. 4,208,382]selexol, propylene carbonate [U.S. Pat. No. 2,926,751]and others are widely used for the removal of $H_2S$ from gases such as natural gas and syngas from coal gasification. In such cases the solvent is contacted counter currently with the gas and the solvent is then heated and later stripped to remove one of the dissolved gases, $H_2S$ [U.S. Pat. No. 4,198,388]. In many of those applications, $CO_2$ is also present and it is important to minimize the $CO_2$ that is released together with the $H_2S$ in the stripping of the solvent. This is due to the fact that high concentration of $CO_2$ would make complete conversion of the $H_2S$ in a chemical process more difficult. This complexes the design of the extraction column, and there are a number of commercial designs that have solved that problem [Kohl and Riesenfeld, 1985, Newman, 1985]. The details of these designs are not relevant to our inventions. It is enough to know that satisfactory design exists.

One important and well known feature of these designs is that they require a solvent which is highly selective for $H_2S$ as compared to $CO_2$. This is especially important if the concentration of $CO_2$ is much higher than that of $H_2S$.

It is obvious to those skilled in the art that any improvement in selectivity has great value in making the cost of separating and extending the range of relative conditions over which the method is commercially viable. The field of the present invention is the description of a method which simplifies the search for improved solvents as well as specific examples of solvent mixtures with greatly enhanced selectivity properties.

Partially Miscible Solvent Mixtures With A Critical Point of Miscibility.

Let us consider a binary mixture of solvents which have a critical point of miscibility. The meaning of such a critical point can be explored by a phase diagram (see FIG. 1).

This figure describes the concentration of component A and B as a function of temperature. The region marked "one phase" represents conditions of complete miscibility of components A and B, whereas regions marked "two phase" correspond to separation into two phases. When the phase diagram shows a maximum (FIG. 1a), it is called an upper critical solution temperature (UCST), whereas a minimum (FIG. 1b) corresponds to a lower critical solution temperature (LCST).

Liquids posses also a vapor-liquid critical point. Above the critical temperature, there is only one fluid phase independent of pressure. In the last twenty years, it was found that near this critical point there are some very interesting thermodynamic properties, [Paulaitis, et al., 1983]. Those unique properties have resulted in the development of separation processes named supercritical extraction. However, that field should not be confused with the present art.

SUMMARY OF THE INVENTION

The present invention relates to a process for selectively removing $H_2S$ from a gas stream containing both $H_2S$ and $CO_2$ which comprises:

contacting said gas stream with a solvent comprising a mixture of N-methylpyrrolidone (NMP) and dodecane, said mixture having a critical point of miscibility, to selectively dissolve $H_2S$ in said solvent thereby providing a gas stream of reduced $H_2S$ content and a solvent containing dissolved $H_2S$.

DESCRIPTION OF THE PREFERRED EMBODIMENTS

Description of the Solvents Proposed

Ludmer et al. [1987]have previously shown that a class of solvent mixtures in the vicinity of their critical point of miscibility obtain an increased solubility for some solids. Contrary however to our previous publication, we have found here that the maximum effect is not in the neighborhood of the critical point. In fact it is often more pronounced in a region where two liquid phases exist. It was detected in some systems to have a maximum effect close to the phase transition and not necessarily at the critical composition.

Let us now look as to what available evidence and theory predict for the solubility of a gas in a solvent mixture as a function of composition. If one uses, for example, a mixture of two solvents, then solubility of a gas at low gas pressure can be expressed as follows. If H is the Henry constant defined by $$H_1 \text{-} p_i/S_i \tag{1}$$

where $p_i$ is the partial pressure of the gas compound in equilibrium with the solution and $x_i$ the molar fraction of the dissolved gas in the mixed solution, then the solubility of the gas in an ideal mixture and low gas concentration can be computed [O'Connell, 1971]by Krischevsky [1937]equation $$lnH_{3,m} \text{-} S_1 lnH_{3,1} + X_2 lnH_{3,2} \tag{2}$$

Where 3 denote for the dissolved gas, 1 and 2 for the solvents and m for the mixture. $H_{3,1}$ and $H_{3,2}$ are the Henry constants in the pure solvents. Equation 2 is derived by computing the thermodynamic potential in an ideal mixture of two solvents with no interactions. Obviously, pariially miscible solvents have strong interactions, which can be indicated by either positive (higher Henry Constant) or negative (decreased Henry's Constant) deviations compared to Eq. 2. However, the solubility of different gases in the same CST forming mixture can result in different deviation in magnitude, and in some solvent gas systems, also in the deviation sign. These phenomena can result in increased selectivity when compared to the pure constituents of the mixture.

Figure 1:
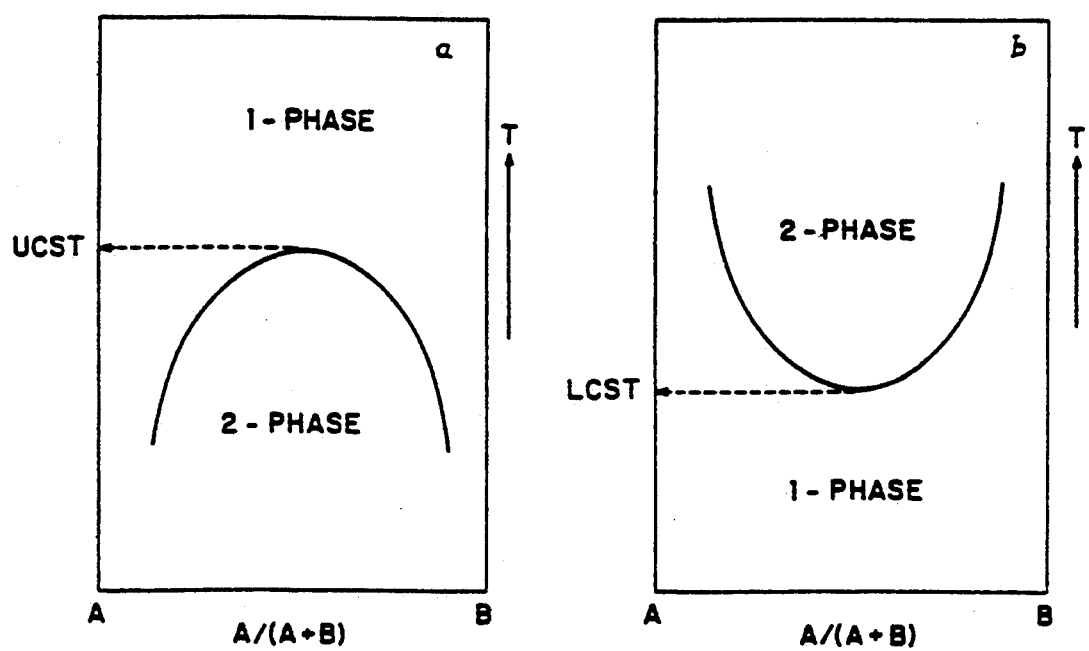
FIG. 1(a) is a phase diagram of an immiscible binary system with an upper critical solution temperature.
FIG. 1(b) is a phase diagram of an immiscible binary system with a lower critical solution temperature.
Figure 2:
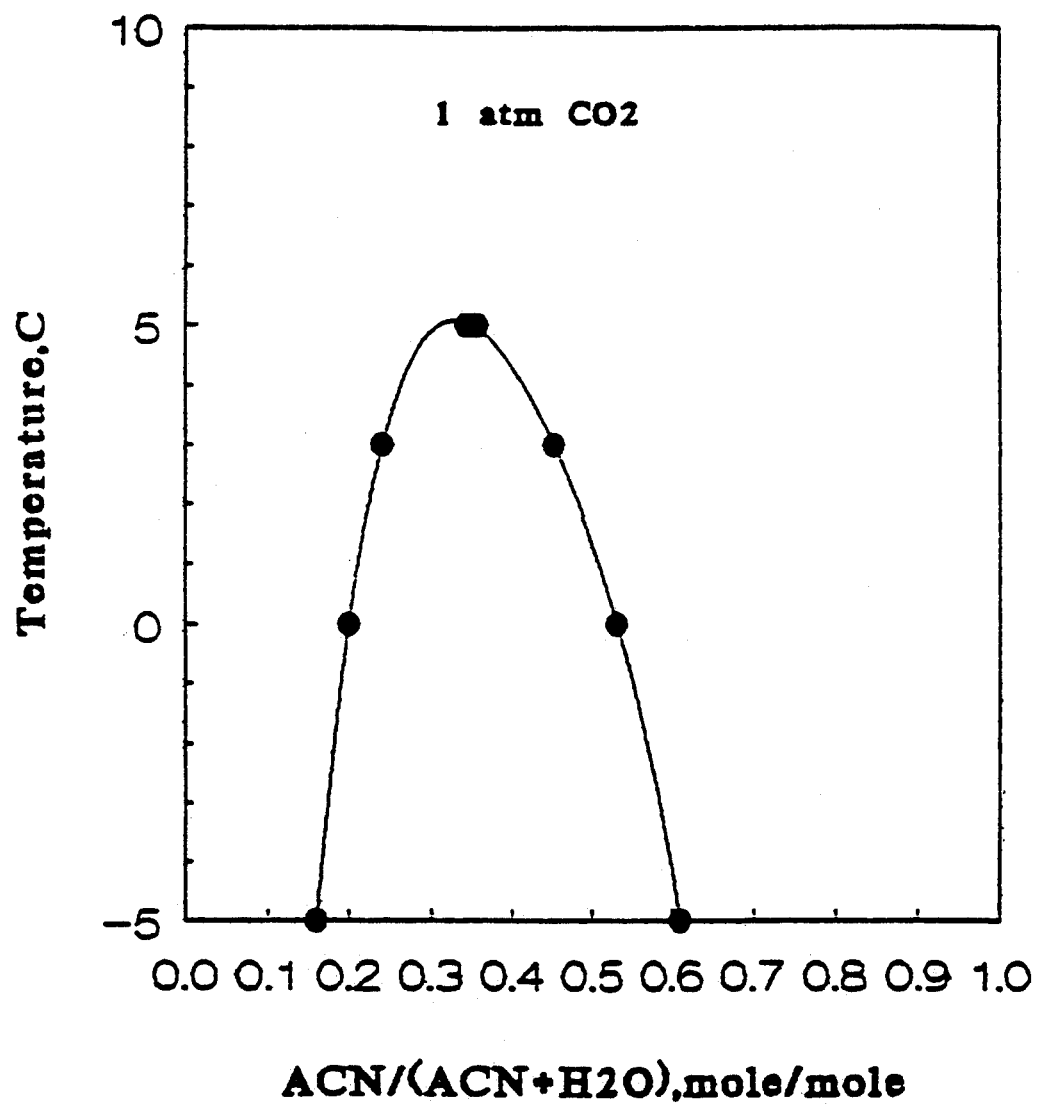
FIG. 2 is a phase diagram of an acetonitrile/water system.
Figure 3:
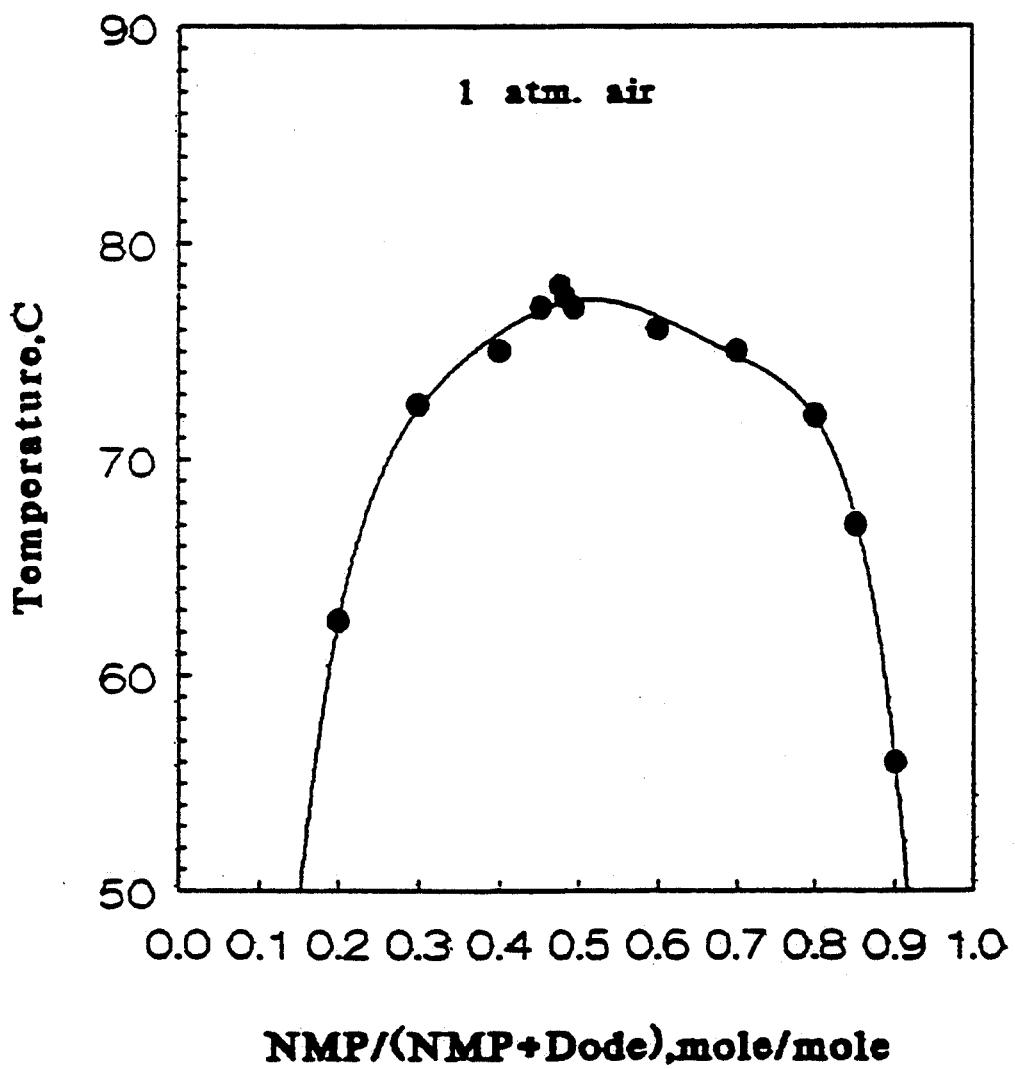
FIG. 3 is a phase diagram of an NMP/dodecane system.
Figure 4:
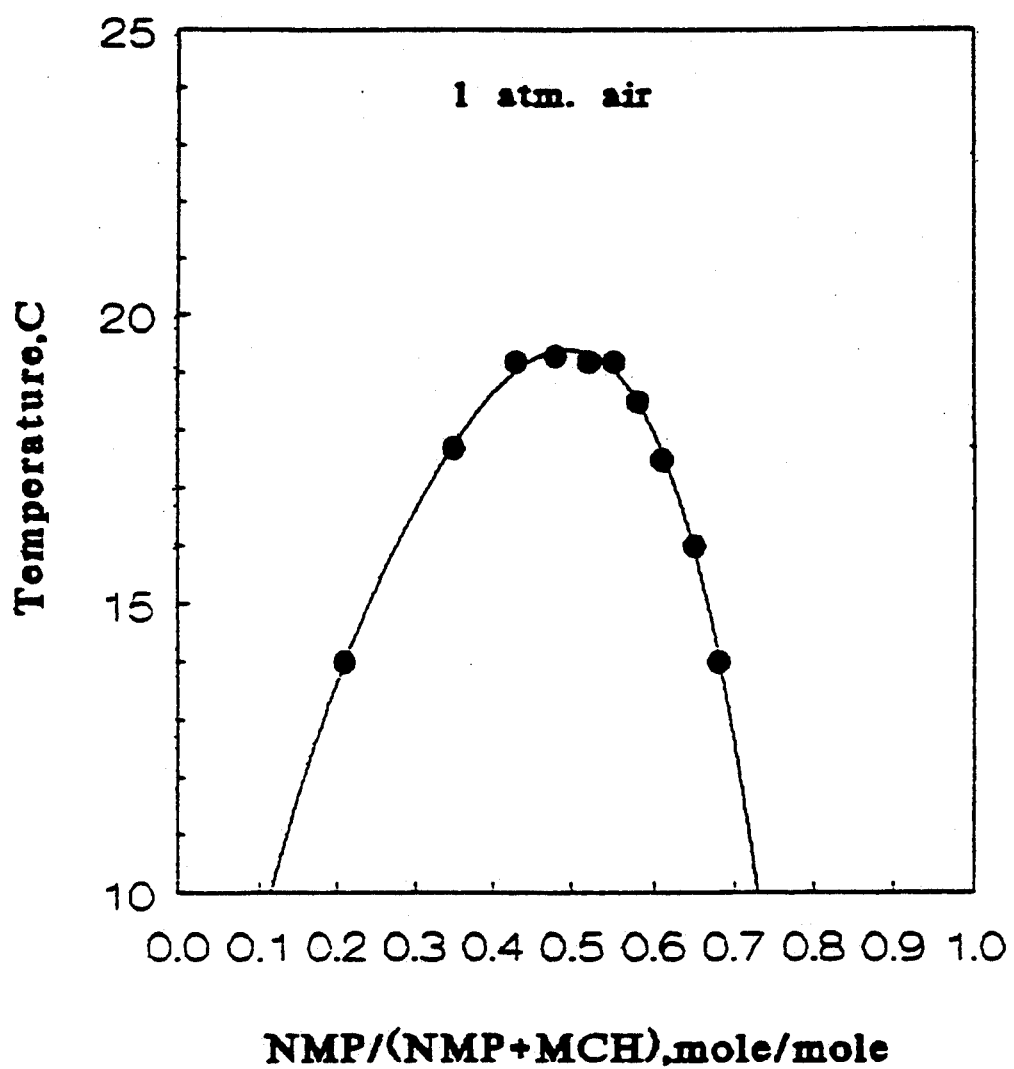
FIG. 4 is a phase diagram of an NMP/methylcyclohexane system.

In tables 1 to 4, we present some typical gas solubility results for selected mixtures of partially miscible solvents both above and below the critical point of miscibility, and as a reference, table 5 summarizes the solubility of the gases in the pure solvents. The example solvents being three solvent pairs NMP-dodecane, NMP-methyl-cyclohexane and acetonitrile-water. In FIGS. 2 to 4 we show the diagrams of the above solvent pairs.

We found strong effects, as far as selectivity is concerned, in all of the above mentioned solvent mixtures. However, only in the NMP-dodecane and the acetonitrile-water mixtures is the effect useful for our purposes. In the NMP-methyl-cyclohexane case the nonlinear effect favors $CO_2$ over $H_2S$. At present, we have no method that would predict the direction of the effect in a specific solvent mixture All what we have established is that the effects are surprisingly large and that such effects have never been reported in the literature. As one can notice from tables 3 and 4, the maximum selectivity is not close to the CST but rather in the two phase region. The total solubility in these cases is reduced but still acceptable. The increase in selectivity is technically and economically of some importance.

We do not claim that all mixtures of partially miscible solvents with a critical point of solubility will have these effects or that adding a second solvent that forms a critical mixture will always increase selectivity. What we claim is that addition of such a second solvent can in some systems lead to drastic improvements in selectivity as illustrated by the above examples. However, it should be pointed out that some solvent systems may favor $CO_2$ over $H_2S$. The references cited above are cited in greater detail below.

Description of the Proposed Process

As said before, removal of acid compounds such as $H_2S$ and $CO_2$ from gas streams by physical solvents is common commercial practice, and proven process equipments and flow-sheets are available.

In our process modification, the type of equipment used remains the same. What our proposed process modification does, is to increase the selectivity of the gas removal by improving the selectivity of the solvent. As an example we provide data for removing $H_2S$ in the presence of $CO_2$. That could in principal be achieved in two ways. One is to find a better, more selective solvent. A solvent mixture of the type described here could serve this purpose and we will give an example later. A second way is to take the primary solvent that is used in the process and add to it a second solvent that forms with it a solution with a critical point of miscibility. An example of such a type is NMP (normal methyl pyrolidinone) which is used in the Purisol process. If 8% (17% by volume) dodecane is added to it then at a temperature of about 35° C., the selectivity is increased by 60%.

The solubility and selectivity for this example are given in tables 1 to 4. We note that the mixture with 8% dodecane and at 35° C. is not at the critical composition or temperature which are 50% dodecane, 50% NMP at temperature of 78° C., but in the NMP rich phase. However, similar effects could also be observed in the one phase region. We argue that it is the nature of such mixtures to promote non-linear effects over a wide range of concentrations and our claim is over the whole region where such effects persist.

A second example is the case where acetonitrile is the primary solvent. It is not commonly used in gas purification, but has excellent properties. Here addition of 30% (by volume) water at 5° C. leads to a greatly improved solvent with higher selectivity for $H_2S$ compared to $CO_2$, as can be seen from the data in tables 3 and 4.

Solvent mixtures with a critical point are also formed if more than one additional solvent is added. Even solid compounds can be added to change the properties of the solvent mixture as well as the composition and temperature of the critical point. Such cases do not substantially modify the basic concept of our invention and are therefore part of the improved process method claimed.

There is a large class of such solvent mixtures both binary and ternary that are potential candidates for improved gas absorption and the above solvent systems are considered as examples of a practical realization of our model concept.

| Reference Cited | | |
|---|---|---|
| UNITED SATE PATENTS | | |
| 2,926,751 | Kohl et al. | Mar. 1, 1960 |
| 3,103,411 | Werner | Sep. 10, 1963 |
| 4,198,388 | Laslo ey al. | Apr. 15, 1980 |
| 4,208,382 | Blume et al. | Jun. 17, 1980 |
| OTHER PUBLICATIONS | | |
| Kohl, A. and Riesenfeld, F., "Gas Purification", Fourth ed., Gulf Publication Company, 1985. | | |
| Krischevsky, I., R., Zh. Fiz. Khim., Vol. 9, 41, 1937. | | |
| Ludmer, Z., Shinnar, R. and Yakhot, V., "Solubility in Binary Mixtures at the Immiscibility Critical Point", AIChE J., Vol. 33, 1776-1780, 1987. | | |
| Newman A. S. (editor), "Acid and Sour Gas Treating Processes", Gulf Publication Company, 1985. | | |
| O'Connell, J. P., "Molecular Thermodynamics of Gases in Mixed Solvents", AIChE J., Vol. 17, 658-663, 1971. | | |
| Paulaitis, M. E., et al., "Supercritical Fluid Extraction", Rev. Chem. Eng., Vol. 1, 179, | | |

TABLE 1

Solubility of carbon dioxide and hydrogen sulfide (at 1 atm partial pressure) in the one phase region.

| Solvents System | Solute (gas) | Temp. °C. | Solub.[1] | Solubility Ratio Mixture/ Good Solvent | Mixture/ Poor Solvent | Mixture/ Raoult's[2] |
|---|---|---|---|---|---|---|
| Acetonitrile (good solv.) + Water (poor solv.) $(0.609)^3$ | $CO_2$ | 10 | 4.40 | 0.464 | 3.451 | 1.973 |
| | | 15 | 3.87 | 0.444 | 3.686 | 2.026 |
| | | 20 | 3.54 | 0.426 | 3.933 | 2.082 |
| | | 25 | 3.21 | 0.401 | 4.280 | 2.169 |
| | $H_2S$ | 15 | 16.30 | 0.534 | 5.552 | 2.876 |
| | | 20 | 13.85 | 0.519 | 5.368 | 2.778 |
| | | 45 | 7.81 | 0.462 | 5.049 | 2.543 |
| | | 60 | 5.23 | 0.400 | 4.144 | 2.117 |

TABLE 1-continued

Solubility of carbon dioxide and hydrogen sulfide (at 1 atm partial pressure) in the one phase region.

| Solvents System | Solute (gas) | Temp. °C. | Solub.[1] | Solubility Ratio Mixture/ Good Solvent | Mixture/ Poor Solvent | Mixture/ Raoult's[2] |
|---|---|---|---|---|---|---|
| NMP (good solv.) | $CO_2$ | 78 | 0.84 | 0.467 | 1.024 | 0.832 |
| Dodecane (poor solv.) (0.297)[3] | $H_2S$ | 78 | 11.58 | 0.739 | 5.514 | 2.305 |
| NMP (good solv.) | | 18 | 4.40 | 0.894 | 2.018 | 1.401 |
| | | 20 | 4.20 | 0.878 | 1.974 | 1.372 |
| | | 30 | 3.50 | 0.854 | 1.938 | 1.338 |
| Methyl-Cyclohexane (0.412)[3] | $CO_2$ | 40 | 2.92 | 0.859 | 1.879 | 1.352 |
| | | 50 | 2.39 | 0.885 | 1.833 | 1.317 |
| | | 60 | 1.90 | 0.805 | 1.753 | 1.228 |
| | | 70 | 1.42 | 0.703 | 1.632 | 1.107 |
| | $H_2S$ | 10 | 53.55 | 0.729 | 3.688 | 2.031 |
| | | 20 | 45.08 | 0.717 | 3.840 | 2.009 |
| | | 30 | 33.52 | 0.638 | 3.520 | 1.774 |
| | | 40 | 24.58 | 0.598 | 3.208 | 1.598 |
| | | 50 | 18.52 | 0.593 | 3.046 | 1.515 |
| | | 60 | 13.99 | 0.593 | 3.937 | 1.461 |
| | | 70 | 11.00 | 0.564 | 3.013 | 1.430 |

[1]Volume of the gas at standard condition over solute-free solvent volume.
[2]Ideal mixture (eq. 2).
[3]Volume fraction of the good solvent

TABLE 2

Solubility of carbon dioxide and hydrogen sulfide in critical mixtures (at 1 atm partial pressure) in the two phase region.

| Solvents System | Phase | Temp. °C. | Solub.[1] | Mixture/ Good Solvent | Mixture/ Poor Solvent | Mixture/ Raoult's[2] |
|---|---|---|---|---|---|---|
| Aetonitrile (good solv.) + Water (poor solv.) + $CO_2$ (gas) | ACN rich | −5 | 11.84 | 1.024 | 6.072 | 2.349 |
| | | 0 | 8.76 | 0.826 | 5.078 | 2.246 |
| | | 3 | 7.25 | 0.706 | 4.560 | 2.287 |
| | | 5 | 5.48 | 0.545 | 3.651 | 2.148 |
| | Water rich | −5 | 3.21 | 0.277 | 1.644 | 1.367 |
| | | 0 | 3.44 | 0.324 | 1.992 | 1.555 |
| | | 3 | 3.92 | 0.382 | 2.465 | 1.790 |
| | | 5 | 5.33 | 0.530 | 3.553 | 2.141 |
| | Average | −5 | 8.00 | 0.692 | 4.103 | 2.548 |
| | | 0 | 6.40 | 0.604 | 3.710 | 2.974 |
| | | 3 | 5.78 | 0.563 | 3.635 | 2.189 |
| | | 5 | 5.41 | 0.538 | 3.607 | 2.147 |
| +$H_2S$ (gas) | ACN rich | 5 | 28.90 | 0.858 | 7.298 | 2.555 |
| | Water rich | 5 | 8.95 | 0.266 | 2.260 | 1.731 |
| | Average | 5 | 21.44 | 0.636 | 5.414 | 3.017 |
| NMP (good solv.) + Dodecane (poor solv.) + $CO_2$ (gas) | NMP rich | 20 | 3.12 | 0.652 | 2.940 | 0.735 |
| | | 35 | 2.09 | 0.572 | 2.173 | 0.635 |
| | | 45 | 1.53 | 0.553 | 1.776 | 0.628 |
| | | 65 | 1.18 | 0.538 | 1.426 | 0.658 |
| | Dodecane rich | 20 | 1.06 | 0.222 | 1.000 | 0.855 |
| | | 35 | 0.97 | 0.265 | 1.007 | 0.876 |
| | | 45 | 0.89 | 0.321 | 1.031 | 0.909 |
| | | 65 | 0.83 | 0.379 | 1.005 | 0.863 |
| | Average | 20 | 1.49 | 0.312 | 1.406 | 0.738 |
| | | 35 | 1.20 | 0.329 | 1.250 | 0.710 |
| | | 45 | 1.02 | 0.369 | 1.186 | 0.732 |
| | | 65 | 0.91 | 0.414 | 1.096 | 0.743 |
| +$H_2S$ (gas) | NMP rich | 20 | 55.60 | 0.885 | 8.633 | 1.226 |
| | | 35 | 44.50 | 0.931 | 8.768 | 1.340 |
| | | 50 | 32.24 | 0.856 | 7.694 | 1.187 |
| | | 65 | 19.94 | 0.924 | 6.453 | 1.388 |
| | Dodecane rich | 20 | 9.02 | 0.144 | 1.400 | 1.153 |
| | | 35 | 9.49 | 0.198 | 1.870 | 1.490 |
| | | 50 | 10.03 | 0.266 | 2.394 | 1.896 |
| | | 65 | 11.27 | 0.522 | 3.647 | 2.621 |
| | Average | 20 | 22.94 | 0.365 | 3.562 | 1.451 |
| | | 35 | 20.20 | 0.422 | 3.981 | 1.597 |
| | | 50 | 17.96 | 0.422 | 3.981 | 1.721 |
| | | 65 | 14.08 | 0.653 | 4.558 | 2.003 |
| NMP (good solv.) + Methyl-cyclohexane (poor solv.) | NMP rich | 10 | 5.56 | 1.010 | 2.269 | 1.304 |
| | | 15 | 5.03 | 0.978 | 2.206 | 1.315 |
| | MCH rich | 10 | 3.67 | 0.667 | 1.498 | 1.380 |
| | | 15 | 3.50 | 0.680 | 1.534 | 1.300 |
| | Average | 10 | 5.10 | 0.927 | 2.080 | 1.451 |

TABLE 2-continued

Solubility of carbon dioxide and hydrogen sulfide in critical mixtures (at 1 atm partial pressure) in the two phase region.

| Solvents System | Phase | Temp. °C. | Solub.[1] | Mixture/ Good Solvent | Mixture/ Poor Solvent | Mixture/ Raoult's[2] |
|---|---|---|---|---|---|---|
| +$CO_2$ (gas) | | 15 | 4.66 | 0.906 | 2.042 | 1.419 |

[1] Volume of the gas at standard condition over solute-free solvent volume.
[2] Ideal mixture (eq. 2)

TABLE 3

Selectivity of hydrogen sulfide in respect to carbon dioxide in critical mixtures (at 1 atm partial pressure) in the one phase region.

| Solvents System | Temp. °C. | Volume Fraction (good solv.) | Selc.[1] | Selectivity Ratio Mixture/ Good Solvent | Mixture Poor Solvent |
|---|---|---|---|---|---|
| Acetonitrile (good solvent) + Water (poor solvent) | 15 | 0.609 | 4.212 | 1.203 | 1.506 |
|  | 20 |  | 3.912 | 1.219 | 1.365 |
| NMP (good solvent) + Dodecane (poor solvent) | 78 | 0.297 | 13.786 | 1.582 | 5.383 |
| NMP (good solvent) + Methyl-cyclohexane (poor solvent) | 20 | 0.412 | 10.733 | 0.817 | 1.946 |
|  | 30 |  | 9.577 | 0.748 | 1.816 |
|  | 50 |  | 7.749 | 0.670 | 1.662 |
|  | 60 |  | 7.363 | 0.736 | 1.676 |
|  | 70 |  | 7.746 | 0.802 | 1.846 |

[1] Ratio- mole $H_2S$ to mole $CO_2$ absorbed

TABLE 4

Selectivity of hydrogen sulfide in respect to carbon dioxide in critical mixtures (at 1 atm partial pressure) in the two phase region.

| Solvents Systems | Phase | Temp. °C. | Volume Fraction (good solv.) | Selec.[1] | Selectivity Ratio Mixture/ Good Solvent | Mixture/ Poor Solvent |
|---|---|---|---|---|---|---|
| Acetonitrile (good solvent) + | ACN rich | 5 | 0.70 | 5.277 | 1.578 | 2.00 |
| Water (poor solvent) | Water rich | 5 | 0.45 | 1.679 | 0.502 | 0.636 |
| NMP (good solv.) + | NMP rich | 20 | 0.85 | 17.84 | 1.358 | 2.937 |
|  |  | 35 | 0.83 | 21.33 | 1.628 | 4.040 |
| Dodecane (poor solv.) | Dodec. rich | 20 | 0.06 | 8.51 | 0.648 | 1.401 |
|  |  | 35 | 0.07 | 9.81 | 0.748 | 1.858 |

[1] Ratio - mole $H_2S$ to mole $CO_2$ absorbed.

TABLE 5

Solubility of carbon dioxide and hydrogen sulfide (at 1 atm and 20° C.) in pure solvents.

| Solvent | Solute (gas) | Solubility[1] |
|---|---|---|
| Acetonitrile | $CO_2$ | 8.31 |
|  | $H_2S$ | 26.69 |
| NMP | $CO_2$ | 4.78 |
|  | $H_2S$ | 62.82 |
| Methyl-cyclohexane | $CO_2$ | 2.13 |
|  | $H_2S$ | 11.74 |
| Dodecane | $CO_2$ | 1.06 |
|  | $H_2S$ | 6.44 |
| Water | $CO_2$ | 0.89 |
|  | $H_2S$ | 2.58 |

[1] Volume of the gas at standard condition over solute-free solvent volume.

What is claimed is:

1. A process for selectively removing $H_2S$ from a gas stream containing both $H_2S$ and $CO_2$ which comprises: contacting said gas stream with a solvent comprising a mixture of N-methylpyrrolidone (NMP) and dodecane, said mixture having a critical point of miscibility, to selectively dissolve $H_2S$ in said solvent thereby providing a gas stream of reduced $H_2S$ content and a solvent containing dissolved $H_2S$.

2. The process of claim 1 which further comprises: removing said dissolved $H_2S$ from said solvent containing dissolved $H_2S$.

3. The process of claim 1 wherein said mixture comprises about 20% of dodecane.

* * * * *